United States Patent Office 2,838,578
Patented June 10, 1958

2,838,578

ETHYL CHLORIDE MANUFACTURE

Franklin Conrad and Merle L. Gould, Baton Rouge, La., assignors to Ethyl Corporation, New York, N. Y., a corporation of Delaware No Drawing. Application October 22, 1954
Serial No. 464,178

1 Claim. (Cl. 260—662)

This invention relates to the production of ethyl chloride and more particularly to the manufacture of ethyl chloride from hydrocarbons.

Ethyl chloride is an important and valuable commercial product which finds numerous uses both as an intermediate and as a final product. Thus, ethyl chloride is employed in the manufacture of tetraethyl lead as well as being used as refrigerant and as a local anesthetic for minor operations. The most widely used commercial technique for its manufacture involves the hydrochlorination of ethylene by anhydrous hydrogen chloride in the presence of a liquid catalyst solution, or reaction medium, comprising ethyl chloride having dissolved therein anhydrous aluminum chloride or other similar catalysts. The use of super-atmospheric pressures (U. S. 1,518,182) has been found to be exceptionally effective, and pressures above atmospheric to over 11 atmospheres have been employed.

Ethane can also be converted to ethyl chloried by several well-known chlorination processes and has the important advantage of being available in large quantities and at a fraction of the cost of ethylene. The economical utilization of this cheaper raw material has heretofore been hampered by the inability to effectively obtain a complete utilization of all of the chlorine and ethane values employed therein. For example, the degree of conversion of ethane to ethyl chloride, as well as the avoidance of explosive mixtures, is facilitated by the presence of a large molar excess of ethane. The use of such an excess of ethane in an industrial process would require the continuous recycle of unreacted ethane in order to obtain a commercially practical yield of ethyl chloride. The product gases also contain considerable quantities of ethylene and hydrogen chloride which can only be separated by complex and costly operations. The continued presence of these non-reactables in the recycle stream constitutes a barrier to the use of a recycle operation since their concentration will continue to build up in the system. Further, the hydrogen chloride formed in the process not only represents, at the present time, a degradation of valuable chlorine, but also presents the more serious problem of the safe and economical disposal of this corrosive and toxic material.

The desirability of combining these two methods of preparing ethyl chloride so as to effect a more complete utilization of the reactants has already been recognized. The prior art discloses a process for chlorinating ethane, mixed with ethylene, at elevated temperatures and then subsequently carrying out a hydrochlorination operation by reacting the ethylene and by-product hydrogen chloride at a lower temperature to produce additional quantities of ethyl chloride. Although an improvement over the prior art, this process is nevertheless disadvantageous in many respects and, as far as is known, has never been employed commercially.

It is accordingly an object of the present invention to provide an improved process for the production of ethyl chloride. Another object of the invention is to provide an improved unitary process for the more efficient and economical production of ethyl chloride from a feed stream containing ethane and ethylene. A further object is to provide an improved process, of the above type, which eliminates compression of highly corrosive hydrogen chloride process streams. Still another object is to provide a process of the above type which employs natural mixtures of ethane and ethylene as a feed material. Other objects and advantages of the present invention will become apparent from the following description and appended claim.

It has now been found that ethyl chloride can be produced in a combined hydrochlorination-chlorination process in which all reactants are essentially completely converted to the desired product without appreciable formation of an undesired polymeric complex between ethylene and the hydrochlorination catalyst and without the necessity of costly and difficult separation operations. The process involves the use of super-atmospheric pressure in both the hydrochlorination and chlorination steps, preferably with a higher pressure in the chlorination step, and the use of a stoichiometric excess of hydrogen chloride in the hydrochlorination step. The use of an excess quantity of hydrogen chloride in the hydrochlorination operation not only minimizes the above described polymer formation but also materially increases the hydrochlorination catalyst life.

The use of elevated pressure both in the reaction and recovery steps of the combined process is an important contribution to the improved operability of this process over prior ethyl chloride manufacturing processes. A particular important consequence of this type of process is the increased ethyl chloride content of the reaction products, i. e. higher than 90 percent, and the concurrent reduced formation of normally occurring unsaturated chloroethylene by-products. The pressure differential between the hydrochlorination and chlorination step permits the use of the desired hydrogen chloride excess without the necessity of costly and difficult recovery operations and eliminates the need for the pressurization of process streams containing appreciable quantities of highly corrosive hydrogen chloride.

In its broadest form the invention comprises contacting a hydrochlorination catalyst with a reaction mixture consisting essentially of ethane, ethylene and a stoichiometric excess of hydrogen chloride in a reaction zone maintained at super-atmospheric pressure and at an elevated temperature. The ethyl chloride formed thereby is recovered from the product and the unreacted components of the effluent are subsequently chlorinated to produce additional ethyl chloride and by-product hydrogen chloride. This chlorination reactor operates at a substantial pressure differential above that employed in the hydrochlorination reaction and also at elevated temperatures. After recovering ethyl chloride from the chlorination reaction product, the effluent consisting essentially of unreacted ethane, ethylene and hydrogen chloride (both by-product and recycled excess hydrogen chloride) is then passed to the hydrochlorination reactor where it is mixed with fresh ethane and ethylene.

When it is desired to maintain the polychloroethane by-products at an absolute minimum, it is usually preferred to recycle at least a major portion of the chlorinator effluent back to the chlorinator in order to build up and maintain a hydrogen chloride content of about 35 to about 70 percent by volume in that portion of the chlorinator effluent which is sent to the hydrochlorinator. By these means, it is possible to operate the chlorination reaction under conditions highly favorable to monochlorination, i. e. a high ethane to chlorine mole ratio, and still provide a desirable excess of hydrogen chloride to the hydrochlorination reaction.

In one method of practicing this invention, reactants comprising hydrogen chloride, ethylene and ethane are contacted with a hydrochlorination catalyst, e. g. aluminum chloride, at a temperature between about 20° C. to about 200° C. and at a pressure of between about 2 to 30 atmospheres. The type of reactor, or reactors, employed in this first reaction zone will depend upon the particular conditions employed therein and will in no way limit the invention. Moreover, the reaction can be conducted in either a vapor phase or in a solution. For illustrative purposes, the reaction will be described herein as being conducted in a solution consisting of a catalytic quantity of aluminum chloride dissolved in ethyl chloride and in a reaction vessel consisting of steel shells packed with an inert contact mass, e. g. ceramic Raschig rings, to provide a large contact surface for dissolving the reactants. The reactants, entering through feed distributors, are dissolved in the reactor solution and the ethylene and hydrogen chloride react to form ethyl chloride. With a sufficient amount of active catalyst in the solution, the reaction is almost instantaneous, so that the capacity of the reactors is a function of the solubility of the reactants in the reactor solution. The effectiveness of the catalyst solution is determined qualitatively from the concentration of unreacted ethylene and hydrogen chloride in the gases leaving the reactor.

Reaction products comprising ethyl chloride, ethane, unreacted hydrogen chloride and unreacted ethylene, together with minor quantities of volatile impurities are removed in the overhead vapors from the reactors and sent to a suitable separation section. The separation of the ethyl chloride can be effected by any known method or means, such as vapor-liquid type of distillation, extractive distillation or absorption with a solvent having preferential solubility for the ethyl chloride. When ordinary condensation and liquid-vapor separation methods are employed, the overhead vapors from the reactors are partially condensed by first cooling in a reactor gas exchanger and then by cooling more completely in a highly refrigerated fractionating tower. In this tower most of the ethyl chloride is condensed so that the liquid ethyl chloride collects in the bottom portion and the uncondensed vapor passes out overhead. This overhead vapor, consisting essentially of ethane, some unreacted hydrogen chloride and ethylene as well as some non-condensable impurities, is then sent to the chlorination section of the integrated process.

The catalyst in the hydrochlorination reactors must be replenished periodically to maintain efficient conversion. The amount of active catalyst in the reactors is depleted constantly by a side reaction, proceeding concurrently with the formation of ethyl chloride, which forms a high boiling complex between the catalyst and ethylene. The formation of the complex, which is soluble in the reactor solution, renders the catalyst inactive and the complex must be removed from the reaction medium by continuously withdrawing a portion of the reactor solution, recovering the ethyl chloride and discarding the non-volatile complex. The amount of active catalyst in the reactors is reduced directly by the formation of the complex and is further decreased by the withdrawal of catalyst solution entailed in the removal of the complex. The depletion of catalyst is marked by an increase in the amount of unreacted ethylene and hydrogen chloride in the reactor overhead and in cases of extremely severe conversion loss by a decrease in the reactor temperature. Fresh catalyst is therefore added as needed.

As pointed out above, it has been found that the hydrochlorination step of this invention operates more efficiently with respect to ethylene and catalyst utilization under operating conditions wherein excess quantities of hydrogen chloride of at least 1 percent and preferably between about 2 and 15 percent are employed. The recycle of unreacted hydrogen chloride has heretofore not been feasible because of the resultant build-up in the reactor of an undesirably large concentration of ethane, the separation of which is extremely difficult and complex. In the present invention, however, this desirable hydrochlorination operation is now feasible since the ethane is removed by reaction in the chlorination step to produce additional quantities of valuable ethyl chloride. When operating in this manner, the losses of ethylene and catalyst due to the formation of the above noted complex are markedly decreased and the overall efficiency of the hydrochlorination process is substantially improved.

Although there are numerous hydrochlorination catalysts known to the art, it is generally preferred to use aluminum chloride as a catalyst in this process. Other catalysts, such as the halides of zinc, bismuth, boron, antimony, iron or vanadium have also been found to be suitable for this process. While the present hydrochlorination process is not restricted to an operation wherein the active catalyst concentration is too critical, it is generally desirable that it be maintained in the range 0.1 to 1 weight percent and preferably in the range from 0.1 to 0.3 weight percent.

It will be seen that the principles of the hydrochlorination operation are applicable through a wide range of conditions. The temperature and pressure of operation will be effected by the amount of diluents accompanying the ethylene to the reactor. Generally, the benefits of the invention are most significant in hydrochlorination processes carried out at elevated temperatures and pressures, that is, above about 30° C. and at pressures of over 2 atmospheres. It has been found that a highly desirable range of operating temperatures between about 30° C. and 200° C. and still more preferably between about 40° C. and 80° C. are exceptionally suitable for this operation. Similarly, under these temperature conditions, operating pressures of between about 2 to 30 atmospheres and preferably between about 6 to 14 atmospheres are beneficial to the operation of the process.

As heretofore stated, the overhead vapor from the hydrochlorinator is compressed to a higher pressure than employed in the hydrochlorinator, followed preferably by a pre-mixing with sufficient chlorine to form a feed mixture having a desirable chlorine to ethane mole ratio. This mixture is then fed into a chlorination reaction zone wherein it is subjected to suitable chlorination conditions, such as, temperatures above 300° C. and pressures higher than about 3 atmospheres, to convert the ethane primarily to ethyl chloride. Reaction products comprising unreacted ethane, hydrogen chloride, ethylene, ethyl chloride and volatile impurities are taken from the reaction zone and passed into a suitable product separation zone.

The product separation zone can comprise, for example, an ordinary vapor-liquid distillation or an extractive distillation step. When employing the usual liquid-vapor condensation type of separation, the ethyl chloride is separated as a liquid and the non-condensable hydrogen chloride, ethane, ethylene and volatile impurities are then passed to the hydrochlorinator where they are mixed with a fresh hydrocarbon stream and subjected to a hydrochlorination reaction.

Although different types of reactors can suitably be employed for the chlorination reaction, it is particularly preferred to use a fluidized bed type of reactor in the process of the present invention. By a fluidized bed type is meant a reactor wherein a mass of finely divided inert solids are maintained in a fluidized state by the gas stream entering the reactor. The fluidized bed can be of a conventional type, e. g. stationary bed tubular reactor, employing any suitable fluidizing means or media and can utilize any desired temperature controlling means, either internal or external.

Generally, it is desirable to have the gaseous reactants enter the reaction zone through a plurality of unrestricted openings preferably distributed uniformly over the cross-section of the feed end of the reaction zone. The openings or free area of the feed end should be between about 0.3 and 10.0 percent and preferably between about 0.5 and 2.0 percent of the total cross-sectional area of the feed end. Employing a free area larger than about 10 percent generally results in excessive degradation by carbonization of the reactants and products. Under optimum conditions for minimum carbon formation, it is preferred to employ a free area in the preferred range given above.

The fluidized mass employed within the chlorination reactor is not too critical, but preferably should be one which is inert towards the gaseous mixture. Sand or silicon carbide, free from catalytic impurities, consisting substantially of particles of size 50 to 200 mesh, have been found particularly useful for this purpose. Other suitable and well-known inert media which can be used are graphite, alumina, pumice, silica, mullite, silica-alumina gel, synthetic aluminum silicate, porous earths such as kieselguhr or fuller's earth, and several other well-known non-vesicular inert solid media. When employing a fluidized bed reactor of the above type, the reaction can advantageously be carried out under approximately isothermal conditions wherein the temperature in all parts of the fluid mass differs by no more than 25° C. and preferably below 5° to 10° C. This permits a continuous control over the temperature conditions of the reaction to an extent heretofore unobtainable in the conventional tubular-type or packed bed type reactors.

The particle size of the fluidizing media, while not especially critical, is important. It is preferred to employ a material having an average particle size of between about 50 to 250 mesh and preferably between 70 and 150 mesh. Particles much less than 250 mesh in size are sometimes suitable but tend to be entrained with the product vapors; whereas, particles having a diameter greater than 50 mesh generally result in mechanical difficulties in the fluidization technique.

A wide range of pressures in the chlorination reaction zone are suitable for this invention, and preferably the pressure employed should be at least 1 atmosphere higher than that used in the hydrochlorination reaction. Generally, pressures in the range between about 2 to 35 atmospheres can be employed and pressures between about 5 and 20 atmospheres have been found to be desirable. However, in preferred embodiments of this invention, it has been found particularly desirable to employ pressures in the range between about 9 to 15 atmospheres as the most optimum operating pressures for the maximum conversion of ethane to ethyl chloride and a minimum production of by-products.

Since the reaction rate of the chlorination reaction increases with increasing pressure, the chlorination temperature is to some extent dependent on the operational pressures employed. In general, the temperature of chlorination should be maintained between about 300° C. and 650° C. with temperatures between about 375° C. to 475° C. being especially desirable. Under optimum operating conditions it is preferred to employ temperatures between about 400° C. and 450° C. Temperatures below 300° C. tend to give exceedingly slow reaction rates and incomplete reaction of the feed materials. Temperatures above 650° C. generally result in excessive degradation of the product and reactants, thereby forming carbon and unsaturated components as undesirable products.

The mole ratio of the chlorine feed to the ethane feed material is important but not critical. In general, it can vary between about 0.15:1 to 1.5:1. The particular concentration employed determines to a large extent the proportion of ethane converted to ethyl chloride. To obtain a high yield of ethyl chloride on the basis of ethane reacted, a chlorine to ethane feed ratio of 0.25:1.0 to 0.7:1.0 is preferred. In a preferred embodiment of this invention, a mole ration of 0.3:1.0 to 0.5:1.0 is especially desirable in order to produce maximum conversion of ethane to ethyl chloride while maintaining the production of the higher chlorinated ethanes at an absolute minimum. Moreover, these mole ratios are preferred when it is desired to operate the reaction under adiabatic conditions. When desired, products containing the higher chlorides of ethane, as well as ethyl chloride, can be obtained by using a chlorine to ethane mole ratio of about 0.8:1.0 to 1.5:1.0. The higher chlorinated ethanes have various uses, i. e., as solvents and intermediates. For example, vinyl chloride and vinylidene chloride, valuable monomers, can be produced from the di- and trichloroethanes respectively.

It has been found that the elevated temperature range preferred for the chlorination reaction can be utilized if the reacting materials and the products are exposed to the elevated temperatures for only a brief period and are subsequently cooled. The reaction time required for the process is surprisingly low and under the operating conditions of this invention, substantially all the chlorine fed to reactor is reacted within a reaction time of 0.3 seconds or over. Reaction times from 0.3 to 10 seconds have been found suitable for this reaction although the preferred range of reaction times is from 1.5 to 3.0 seconds. Shorter contact periods can preferably be employed at more elevated temperatures, and conversely, longer contact periods can be employed at lower temperatures.

The velocity of the reactants in the reaction zone is not critical, but should be adequate to support or fluidize the catalyst in the required suspended condition. The precise velocity needed will vary depending upon the particle size and density of the catalyst employed. For the preferred range of catalyst particle size employed, the gas velocity can be varied within the range of 0.3 to 3.0 feet per second and more preferably between about 1.5 to 2.0 feet per second; the lower velocities being suitable for the finer sizes of catalyst.

In general, it is preferred to employ hydrocarbon mixtures consisting essentially of ethane and ethylene as the initial fresh feed material for the process of this invention. Mixtures of ethane and ethylene with small quantities of methane or other saturated hydrocarbons have also been found to be suitable for this process. Generally, mixtures of the above type wherein the ethylene concentration is between about 20 and 60 mole percent can be used satisfactorily in this process. In the preferred embodiment of this invention, however, it is desirable to employ an initial fresh feed stream wherein the ethylene is present to the extent of between about 35 to 55 mole percent of the hydrocarbon mixture. When this stream is mixed with the non-condensable vapor stream from the chlorinator, the ethylene content of the hydrocarbon reaction mixture is preferably maintained between about 25 and 50 mole percent.

For starting operation of the process, it is necessary to employ hydrogen chloride from an outside source until the integrated operation achieves steady operating conditions and the production of hydrogen chloride by the chlorination process is sufficient to satisfy the requirements for the hydrochlorination reaction. When this state is reached, the external source of hydrogen chloride can be closed off and the integrated process can be maintained in a balanced hydrogen chloride and ethylene state by controlling the degree of ethane chlorination or the chlorinator effluent recycle ratio as described above.

The following illustrates by specific examples, typical embodiments of the present process. All parts given are by weight.

*Example 1*

In this example the fresh feed stream employed has the following composition:

| | Mole Percent |
|---|---|
| Methane | 1.0 |
| Ethylene | 46.0 |
| Ethane | 53.0 |

When this stream is mixed with a recycle stream having a composition as detailed below, the resultant hydrocarbon reaction mixture has the following composition:

| | Mole Percent |
|---|---|
| Methane | 9.5 |
| Ethylene | 29.0 |
| Ethane | 61.5 |

This feed stream is mixed with hydrogen chloride and fed to a hydrochlorination reactor at the rate of 193.5 moles per hour of ethylene to 200 moles per hour of hydrogen chloride; this corresponds to an overall mole ratio of 1.05:1.00, HCl:ethylene or a 5 percent excess of hydrogen chloride. The reactor consists of an elongated vertical cylindrical shell having a feed inlet at the bottom and a product stream outlet at the top and contains a previously formed reactor solution consisting substantially of ethyl chloride containing roughly 0.5 weight percent dissolved aluminum chloride. The reaction mixture is maintained at a temperature of 56° C. and a pressure of about 11 atmospheres. In passing up through the reactor solution, the ethylene and hydrogen chloride combine to form ethyl chloride and at the temperature of operation the ethyl chloride so-formed is vaporized and removed in an overhead stream along with the inert ethane. The overhead vapor stream of this example contains about 34.5 mole percent ethyl chloride, 55.2 percent ethane, 8.3 percent methane, 1.8 percent hydrogen chloride and about 0.2 percent minor impurities. This stream is passed to a condenser system where it is cooled sufficiently to condense essentially all of the ethyl chloride present. A portion (about 4.6 percent) of the non-condensed gas stream is vented in order to prevent the build up of methane and other impurities in the system. If desired, this vented stream is passed to an efficient fractionating system wherein the valuable ethane and ethylene can be recovered. The remaining residue gas consisting essentially of about 84.4 mole percent ethane, 13.3 percent methane, 2.2 percent hydrogen chloride and about 0.1 percent minor impurities is then compressed to a pressure of about 15 atmospheres, mixed with a chlorine stream at the same pressure and then fed into a fluidized bed type chlorination reactor. This reactor consists of a vertically positioned cylindrical vessel having a cone shaped bottom section and a perforated feed distribution plate having a free area of about 1 percent and positioned between the cone and cylinder. The fluidizing media is contained in the region above the feed plate; and in this example, sand having a particle size varying from 60 to 170 mesh, and with an average particle size of about 150 mesh, is used. The mixed reactants are fed into the cone and through the feed plate into the fluidized bed and in a proportion of 190.0 moles per hour of chlorine to 380.0 moles per hour of ethane which corresponds to an overall mole ratio of 0.5:1.0, chlorine:ethane. The chlorination reactor is maintained at a temperature of about 470° C. and a pressure of about 14 atmospheres. The flow of feed gases is such that their superficial linear velocity in the reaction zone is about 1.5 feet per second. The residence time of the reacting gases in the reaction zone is only about two seconds, but the chlorine is completely reacted. The exit gases from the chlorination reactor, consisting essentially of about 32.0 mole percent hydrogen chloride, 31.2 percent ethane, 24.0 percent ethyl chloride, 9.2 percent methane, 2 percent dichloroethanes, 1.0 percent ethylene and 0.6 percent minor impurities, are passed through a condensing system wherein the ethyl chloride is removed as a liquid. The non-condensed residue gas from this system consisting essentially of about 43.0 mole percent ethane, 42.5 percent hydrogen chloride, 13.0 percent methane and 1.5 percent ethylene is recycled back to the hydrochlorination system where it is mixed with the incoming fresh feed material at a pressure of about 11 atmospheres.

As heretofore indicated, the hydrochlorination reaction is conducted in a reaction media consisting of ethyl chloride and dissolved aluminum chloride. In the course of the operation of the process, it is necessary to feed liquid ethyl chloride into the hydrochlorination reactor in order to maintain a constant liquid level therein. The relative proportions of product liquid draw-off to the total amount of liquid condensate from the first condenser system will, of course, be effected by the operating temperature and pressures employed. In the present operation about 31 percent of the ethyl chloride condensate is recycled back to the reactor to replace solvent losses overhead.

The yield of ethyl chloride from the hydrochlorination reaction under the conditions of this operation is over 90 percent based either on the ethylene or on the hydrogen chloride fed. Ethyl chloride from the chlorination reaction is obtained in a yield of over 90 percent based on the ethane reacted.

*Example II*

The adaptability of the process of the present invention to the operation with feed streams containing widely varying ethylene concentrations is demonstrated in this example where the ethylene content of the hydrocarbon feed stream to the hydrochlorinator is much lower than in the previous example. The apparatus employed in this example is the same as used in Example I. The procedure of Example I is repeated except that the composition of the hydrocarbon feed stream and the reaction conditions employed are varied to some extent. Thus, the hydrocarbon feed entering the hydrochlorination reactor, i. e. fresh feed plus recycle material, in this example consists essentially of about 76.0 mole percent ethane, 21.1 percent ethylene and 2.9 percent methane. This feed is reacted with hydrogen chloride in the hydrochlorinator in the proportions of 129 moles of ethylene to 132 moles of hydrogen chloride corresponding to a mole ratio of 1.02:1.0, HCl:ethylene. The hydrochlorinator in this example is maintained at a temperature of 50° C. and a pressure of 10 atmospheres. Similarly, the reaction conditions in the chlorinator are varied from those used in Example I and in this example an operating temperature of 400° C. and a pressure of 13 atmospheres are employed. The yields of ethyl chloride obtained are similar to those of Example I.

As noted above, the process of this invention is particularly advantageous when carried out under super-atmospheric pressure since compression of the gaseous reaction mixture, necessary for isolation of the ethyl chloride, is wholly or partially effected; and expensive compression systems are not required. Further, the compressed recycled ethane is much smaller in volume than the ethane recycled when operating at atmospheric pressure, thereby permitting a reduction in the reactor size required for the chlorination reaction.

As already stated, in virtually all forms of the process the chlorination reactor operates at a higher pressure than that employed in the hydrochlorination reactor. The maximum benefits of this type of operation are obtained when the pressure differential is at least about 1 atmosphere and preferably at least about 3 atmospheres.

In other embodiments of this process, a common ethyl chloride purification system for both reactions can be employed. In this type of operation, ethyl chloride is initially condensed in a preliminary separation step thereby permitting the removal of the non-condensed gases overhead as feed to the next reaction step. The ethyl chloride condensates from the two reactions are then combined and purified in a common separation system. Moreover, in the process of this invention the necessity for a sharp separation of ethyl chloride from the other products obtained in the chlorination reaction is diminished since unrecovered ethyl chloride can then be recycled to the hydrochlorination reactor and recovered in that recovery system.

In a further embodiment of this invention, the above described processes can be operated to conjointly produce desirable yields of ethyl chloride and polychloroethanes such as 1,1- and 1,2-dichloroethane. This versatility results from the ability to operate the chlorination reaction over a wide range of chlorine to ethane mole ratios thereby varying the product distribution so obtained. When operating in this manner it is generally desirable to employ a chlorine to ethane mole ratio of about 0.8:1.0 to 1.5:1.0 and preferably between about 0.9:1.0 to 1.2:1.0.

The uniformly high conversions of ethylene to ethyl chloride in the hydrochlorination reaction of this invention is a distinct improvement over the conversions generally obtainable from prior hydrochlorination processes. Of importance also is the fact that these high conversions to ethyl chloride are obtainable even when using feed streams to the hydrochlorinator which have ethylene concentrations as low as 20 percent and which are commonly found in the commercially available hydrocarbon feed streams.

Similar results to those given in the above examples are obtained when the feed stream entering the hydrochlorinator contains as little as 20 percent or as much as 50 percent ethylene. When operating the hydrochlorinator at a pressure as low as 2 atmospheres or as high as 30 atmospheres and at temperatures as low as 30° C. or as high as 200° C. the results obtained are also satisfactory. Similarly, the chlorination reaction produces satisfactory results when operated at temperatures as low as 300° C. or as high as 650° C. and at pressures as low as 2 atmospheres or as high as 35 atmospheres and over the range of chlorine to ethane mole ratios of 0.15:1.0 to 1.5:1.0.

Although the use of a higher pressure in the chlorination step is particularly advantageous, in some cases it may be desirable to hydrochlorinate ethylene in the presence of a stoichiometric excess of hydrogen chloride and at a reaction pressure equal to or greater than the pressure employed in the chlorination step. In this case all of the advantages in using a stoichiometric excess of hydrogen chloride are obtained although some of the operational advantages of the preferred method are lost.

As is apparent from the above, the present invention provides an improved process for the economical and efficient manufacture of ethyl chloride. This is achieved by subjecting an ethane and ethylene reaction mixture successively to a high pressure and high temperature catalytic ethylene hydrochlorination step and a subsequent ethane chlorination reaction. Preferably, the hydrochlorination reaction is conducted at a lower pressure than the chlorination reaction thereby providing many important process advantages, as for example, reduced compression loads, increased compressor equipment life, and simpler and more efficient product recovery operations. Further, the process also permits the use of a desirable excess of hydrogen chloride in the hydrochlorination reaction which results in substantially complete conversion of ethylene to ethyl chloride and a decrease in the catalyst consumption during the reaction.

We claim:

The improved process for the manufacture of ethyl chloride from a hydrocarbon feed stream including ethylene and ethane, comprising mixing said stream with a recycled stream including process generated hydrogen chloride and ethane as hereafter defined, the so-mixed stream including hydrogen chloride in about 2 to 5% molar excess to the ethylene, then feeding said mixed stream to a hydrochlorination zone, said zone containing a liquid reaction medium consisting essentially of ethyl chloride having a catalytic amount of aluminum chloride dissolved therein and being maintained at a temperature of from 40–80° C. and a pressure of from 6 to 14 atmospheres, and hydrochlorinating the ethylene therein, to form an overhead hydrochlorination product stream including ethyl chloride, ethane, and hydrogen chloride, and containing about 0.2 mol percent impurities, ethylene being included in these impurities, removing at least a portion of the ethyl chloride from said product stream and then mixing chlorine with the remaining stream in proportions of from 0.3 to 0.5 moles of chlorine to 1.0 mole of ethane content, and passing the last-mentioned mixed stream to a chlorination zone, the chlorination zone containing fluidized solids and being maintained at a temperature of about 375–475° C. and a pressure of about 5 to 20 atmospheres, contacting the last-mentioned mixed stream with the fluidized solids in the chlorination zone at a superficial velocity of from 1.5 to about 2.0 feet per second for a reaction period of from 1.5 to 3.0 seconds, and reacting essentially all the chlorine, thereby forming a chlorination product stream including ethyl chloride, unreacted ethane and hydrogen chloride, recovering ethyl chloride therefrom thereby forming an ethane and hydrogen chloride containing stream and feeding said stream as above described to the hydrochlorination zone.

References Cited in the file of this patent

UNITED STATES PATENTS

| | | |
|---|---|---|
| 1,293,012 | Boyd | Feb. 4, 1919 |
| 2,140,508 | Chamberlain et al. | Dec. 20, 1938 |
| 2,453,779 | Bond et al. | Nov. 16, 1948 |
| 2,644,016 | Furr et al. | June 30, 1953 |

FOREIGN PATENTS

| | | |
|---|---|---|
| 513,947 | Great Britain | Oct. 26, 1939 |
| 639,435 | Great Britain | June 28, 1950 |